United States Patent
Matsushita et al.

(10) Patent No.: US 10,244,163 B2
(45) Date of Patent: Mar. 26, 2019

(54) IMAGE PROCESSING APPARATUS THAT GENERATES A VIRTUAL VIEWPOINT IMAGE, IMAGE GENERATION METHOD, AND NON-TRANSITORY COMPUTER-READABLE STORAGE MEDIUM

(71) Applicant: CANON KABUSHIKI KAISHA, Tokyo (JP)

(72) Inventors: Akihiro Matsushita, Tokyo (JP); Kiwamu Kobayashi, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/663,163

(22) Filed: Jul. 28, 2017

(65) Prior Publication Data

US 2018/0048810 A1 Feb. 15, 2018

(30) Foreign Application Priority Data

Aug. 12, 2016 (JP) ................................ 2016-158912

(51) Int. Cl.
*H04N 5/232* (2006.01)
*H04N 13/117* (2018.01)
(Continued)

(52) U.S. Cl.
CPC ......... *H04N 5/23229* (2013.01); *G06T 15/00* (2013.01); *H04N 5/247* (2013.01);
(Continued)

(58) Field of Classification Search
CPC ........... H04N 5/23229; H04N 5/23238; H04N 5/23232; H04N 5/23245; G06T 7/74
See application file for complete search history.

(56) References Cited

U.S. PATENT DOCUMENTS

2009/0128667 A1* 5/2009 Gloudemans ............. G06T 7/60
348/241

FOREIGN PATENT DOCUMENTS

JP 2011170487 A 9/2011
JP 2014120093 A 6/2014

OTHER PUBLICATIONS

Cooke et al. "Scalable Virtual Viewpoint Image Synthesis for Multiple Camera Environments." Proceedings of the Ninth International Conference on Information Visualisation (IV'05). 2005 (Year: 2005).*

(Continued)

*Primary Examiner* — Nelson D. Hernández Hernández
(74) *Attorney, Agent, or Firm* — Rossi, Kimms & McDowell LLP

(57) ABSTRACT

An image processing apparatus that generates a virtual viewpoint image based on one or more captured images out of a plurality of captured images by a plurality of cameras, the apparatus comprising an acquisition unit configured to acquire virtual viewpoint information including information related to a position and a direction of a virtual viewpoint, a determination unit configured to determine whether occlusion is occurring in at least one image captured by at least one of the cameras, a decision unit configured to, based on a position and direction of the virtual viewpoint and on a result of the occlusion determination in relation to the at least one image, decide one or more captured images to be used for generation of a virtual viewpoint image, and a generation unit configured to generate a virtual viewpoint image using the decided one or more captured images.

12 Claims, 6 Drawing Sheets

(51) Int. Cl.
*H04N 5/247* (2006.01)
*G06T 15/00* (2011.01)
*H04N 13/111* (2018.01)
*H04N 13/243* (2018.01)

(52) U.S. Cl.
CPC ......... *H04N 13/111* (2018.05); *H04N 13/117* (2018.05); *H04N 13/243* (2018.05)

(56) References Cited

OTHER PUBLICATIONS

Extended European Search Report issued in European Appln. No. 17185816.0 dated Jan. 23, 2018.
Cooke et al. "Scalable Virtual Viewpoint Image Synthesis for Multiple Camera Environments." Proceedings of the Ninth International Conference on Information Visualisation (IV'05). 2005.
Smolic. "3D video and free viewpoint video—From capture to display." Pattern Recognition. 2011: 1958-1968. vol. 44.
Sharma et al. "A flexible architecture for multi-view 3DTV based on uncalibrated cameras." J. Vis. Commun. Image R. 2014: 599-621. vol. 25.
Li et al. "Free-Viewpoint video relighting from multi-view sequence under general illumination." Machine Vision and Applications. 2014: 1737-1746. vol. 25.

* cited by examiner

IMAGE PROCESSING APPARATUS THAT GENERATES A VIRTUAL VIEWPOINT IMAGE, IMAGE GENERATION METHOD, AND NON-TRANSITORY COMPUTER-READABLE STORAGE MEDIUM

BACKGROUND OF THE INVENTION

Field of the Invention

The present invention relates to a technique for generating a virtual viewpoint image from images captured from a plurality of viewpoints.

Description of the Related Art

In recent years, there has been an interest in techniques in which a plurality of cameras are installed at respectively different positions and synchronous capturing is performed at multiple view points, and using a plurality of viewpoint images (multiview images) obtained by the capturing, content (virtual viewpoint content) from the perspective of an arbitrary viewpoint (a virtual viewpoint) is generated. Because it is possible to view, for example, soccer and basketball highlight scenes from various angles by techniques that generate virtual viewpoint content from multi-view images in this way, the user can be given a better viewing experience than with normal images.

Meanwhile, generation and viewing of virtual viewpoint content based on multiview images can be realized by compiling images that a plurality of cameras captured in an image processing unit of a server or the like, applying processing such as rendering in the image processing unit, and ultimately transmitting images to a user terminal.

A technique for generating virtual viewpoint video is disclosed in Japanese Patent Laid-Open No. 2011-170487. In Japanese Patent Laid-Open No. 2011-170487 is disclosed a technique in which an object in video of a plurality of cameras is extracted, three-dimensional coordinates are calculated, and a virtual viewpoint video is generated by re-projection to a plane. In such a system, there are cases in which the re-projection position is erroneous in a case when a state in which multiple objects such as people are overlapped and farther objects are partially hidden by closer objects, so-called occlusion, occurs.

In Japanese Patent Laid-Open No. 2014-120093, it is disclosed that when occlusion occurs, processing to separate a plurality of objects, processing to acquire an object from video of a viewpoint other than the viewpoint in which the occlusion is occurring, and processing to acquire an object from a different frame are combined.

However, there are respective problems with the methods of Japanese Patent Laid-Open No. 2014-120093. The processing for separating the plurality of objects requires a method that uses object tracking processing, for example, image recognition, or processing such as machine learning, but the load of such processing tends to be large. Also, there are cases in which an error such as an erroneous separation occurs, and it is difficult to improve performance.

Also, upon performance of processing for acquiring an object from video of a viewpoint other than the viewpoint in which the occlusion is occurring, an object of significantly different orientation with respect to the virtual viewpoint is more likely to be acquired. The further the position is from the virtual viewpoint, the greater the difference from the actual object shape becomes, and the larger the influence on image quality becomes.

Also, in processing for acquiring an object from a different frame, there is the problem that the longer the time over which the occlusion occurs, the larger the difference in time of the acquired object becomes and the larger the influence on image quality becomes.

SUMMARY OF THE INVENTION

According to the first aspect of the present invention, there is provided an image processing apparatus that generates a virtual viewpoint image based on one or more captured images out of a plurality of captured images obtained by capturing by a plurality of cameras, the apparatus comprising: an acquisition unit configured to acquire virtual viewpoint information including information related to a position and a direction of a virtual viewpoint; a determination unit configured to determine whether occlusion is occurring in at least one image captured by at least one of cameras selected from the plurality of cameras; a decision unit configured to, based on a position and direction of the virtual viewpoint indicated by the virtual viewpoint information acquired by the acquisition unit and on a result of the occlusion determination by the determination unit in relation to the at least one image, decide one or more captured images to be used for generation of a virtual viewpoint image that is based on the virtual viewpoint information; and a generation unit configured to generate a virtual viewpoint image that is based on the virtual viewpoint information using the one or more captured images decided by the decision unit.

According to the second aspect of the present invention, there is provided an image generation method of generating a virtual viewpoint image based on one or more captured images out of a plurality of captured images obtained by capturing by a plurality of cameras, the method comprising: acquiring virtual viewpoint information including information related to a position and a direction of a virtual viewpoint; determining whether occlusion is occurring in at least one image captured by at least one of cameras selected from the plurality of cameras based on the acquired virtual viewpoint information; based on a position and direction of the virtual viewpoint indicated by the acquired virtual viewpoint information and on a result of the occlusion determination, deciding one or more captured images to be used for generation of a virtual viewpoint image that is based on the virtual viewpoint information; and generating a virtual viewpoint image that is based on the virtual viewpoint information using the decided one or more captured images.

According to the third aspect of the present invention, there is provided a non-transitory computer-readable storage medium storing a program for causing a computer to execute a method of generating a virtual viewpoint image based on one or more captured images out of a plurality of captured images obtained by capturing by a plurality of cameras, the method comprising: acquiring virtual viewpoint information including information related to a position and a direction of a virtual viewpoint; determining whether occlusion is occurring in at least one image captured by at least one of cameras selected from the plurality of cameras based on the acquired virtual viewpoint information; based on a position and direction of the virtual viewpoint indicated by the acquired virtual viewpoint information and on a result of the occlusion determination, deciding one or more captured images to be used for generation of a virtual viewpoint image that is based on the virtual viewpoint information; and generating a virtual viewpoint image that is based on the virtual viewpoint information using the decided one or more captured images.

Further features of the present invention will become apparent from the following description of exemplary embodiments (with reference to the attached drawings).

DESCRIPTION OF THE EMBODIMENTS

Below, explanation will be given for embodiments of present invention with reference to the accompanying drawing. Note that embodiments described below merely illustrate examples of specifically implementing the present invention, and are only specific embodiments of a configuration defined in the scope of the claims.

First Embodiment

In the present embodiment, explanation is given of an example of an image processing apparatus for generating virtual viewpoint content. Virtual viewpoint content in the present embodiment is content that includes a virtual viewpoint image generated by simulating an image obtained when a subject is captured from a virtual viewpoint. A viewpoint that is virtual (a virtual viewpoint) may be designated by a user (operator), and it may be automatically designated based on a result of image analysis or the like. Configuration may also be taken such that virtual viewpoint sound generated by simulating the sound that would be heard from the virtual viewpoint is included in the virtual viewpoint content of the present embodiment. In the present embodiment, a method of generating a virtual viewpoint image is described in detail below.

Also, the image processing apparatus of the present embodiment specifies a camera viewpoint for which occlusion of an object is not occurring out of the plurality of camera viewpoints corresponding to the plurality of cameras for capturing a subject from a plurality of viewpoints. Then, the image processing apparatus generates a combination object by object combination in the image captured from the specified camera viewpoint, to generate an image including the combination object as an image of the virtual viewpoint.

Note that occlusion is a state in which objects such as people are overlapping, and a closer object is hiding a part of a farther object. Also, in the present embodiment, concepts encompassing video and still images are described using the expression "images". Specifically, each constituent element of the present embodiment can be processed regardless of whether the image is in accordance with a video format or in accordance with a still image format.

Figure 1:
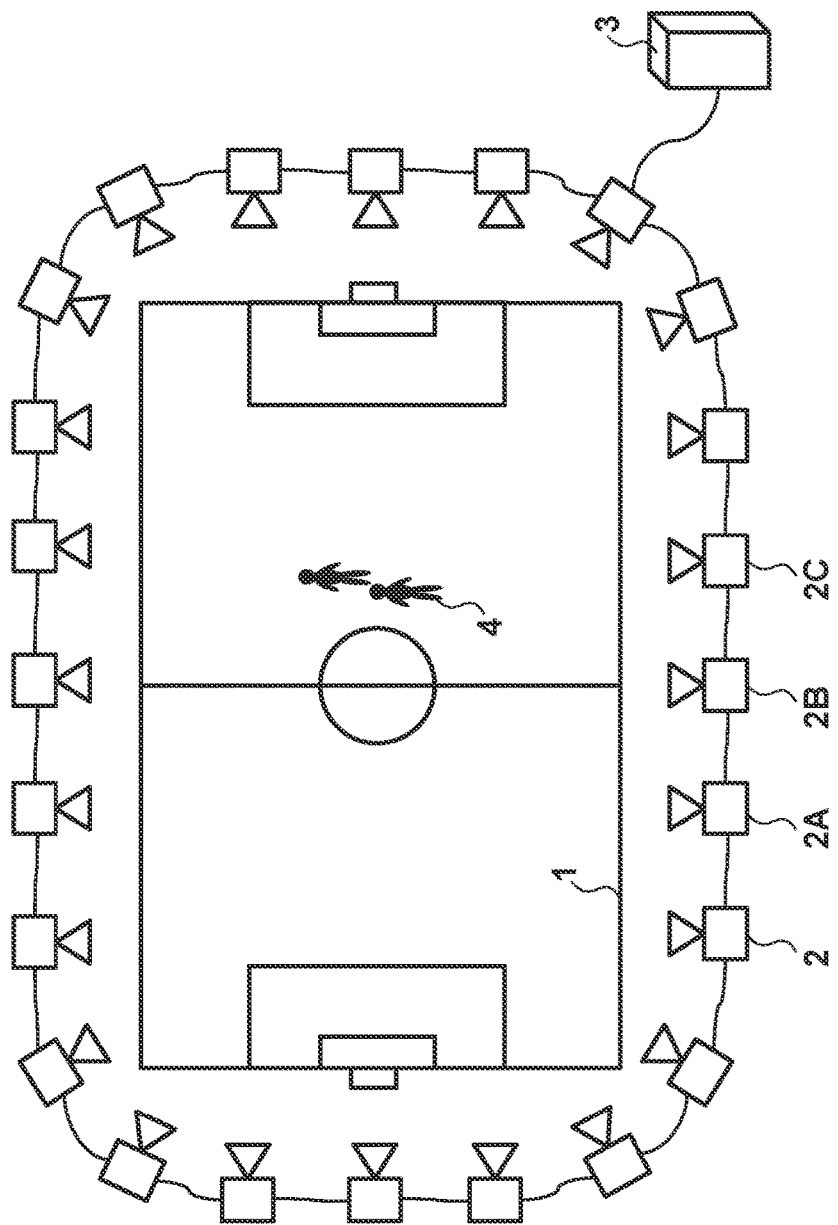
FIG. 1 is a view illustrating a use environment of a system.
Figure 2A:
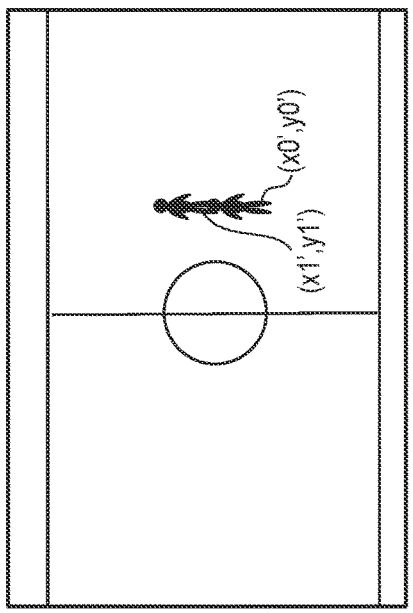
FIGS. 2A-2D are views for illustrating examples of captured images.
Figure 2B:
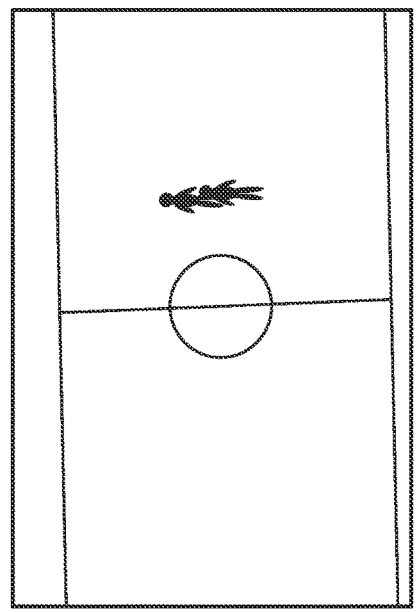
Figure 2C:
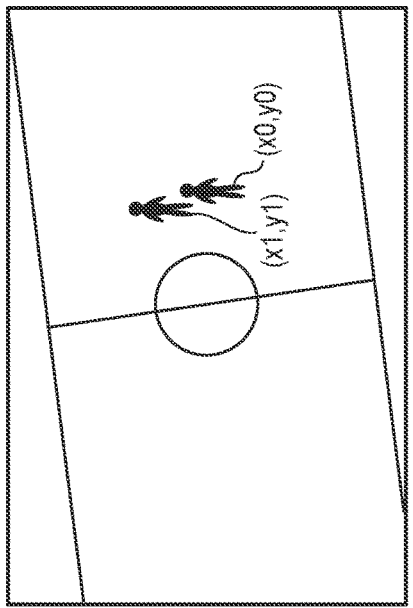

First, a use environment of a system according to the present embodiment will be described using FIG. 1. As is illustrated in FIG. 1, a plurality of cameras 2 are arranged around a stadium 1, and the stadium 1 is captured from a plurality of directions. The cameras 2 comprise input/output hardware for data transmission. The cameras 2 are connected in a ring-formation to each other using network cable, for example, and via a network, transmit images to the camera 2 that is their neighbor. One of the cameras 2 is connected to the image processing apparatus 3, and all of the images of the cameras 2 are transmitted to the image processing apparatus 3. Note that configuration for transmitting all of the images of the cameras 2 to the image processing apparatus 3 are not limited to the above described configuration. Also, a sport such as soccer is played in the stadium 1, and a plurality of people 4 are present as subjects (objects) in the stadium 1. Here, examples of the images (captured images) that are captured by each of the camera 2A, the camera 2B, and the camera 2C are illustrated in FIG. 2A-FIG. 2C. The camera 2A, the camera 2B, and the camera 2C are each at viewpoints that are close to each other, but as shown in FIGS. 2A-2C, images whose viewpoints are slightly differing are obtained because they are positioned at close but different positions to each other.

Figure 3:
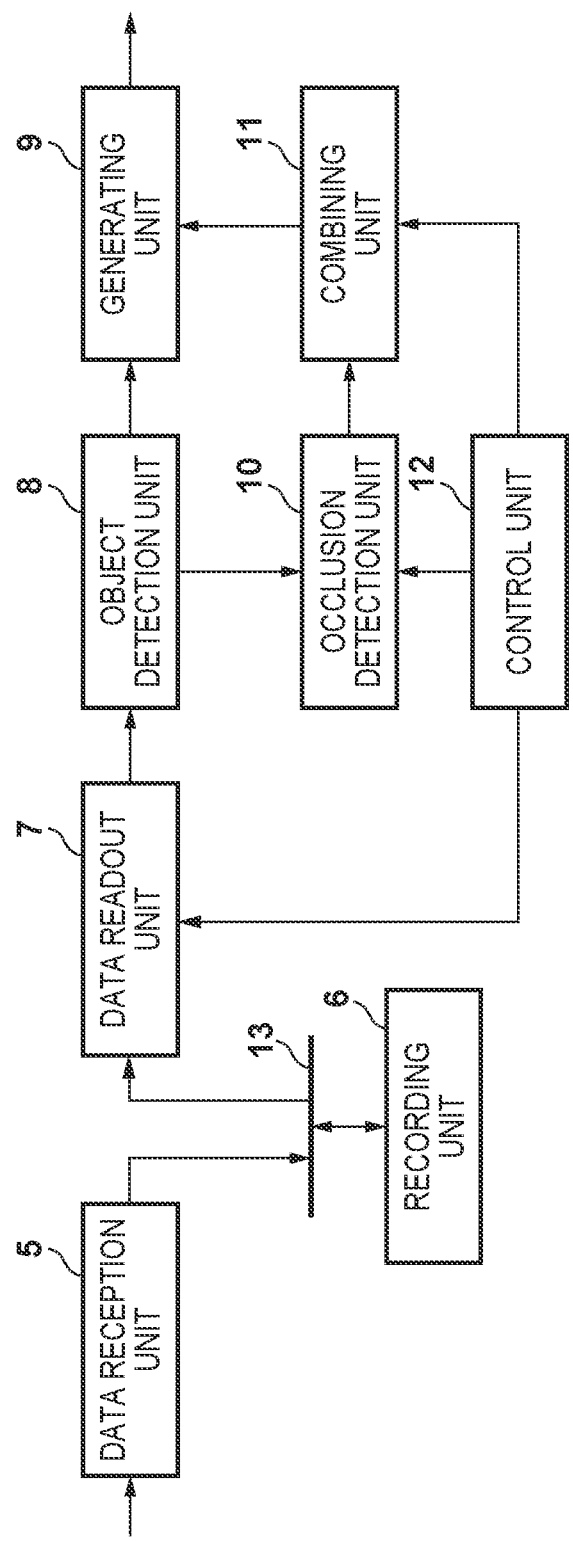
FIG. 3 is a block diagram illustrating an example of a functional configuration of an image processing apparatus 3.

The image processing apparatus 3 receives each of the cameras 2 images, and generates an image (a virtual viewpoint image) at a virtual viewpoint using some of images of the cameras 2. An example of a functional configuration of the image processing apparatus 3 is described using the block diagram of FIG. 3. In the present embodiment, an example in which the functional units described in FIG. 3 are implemented by hardware such as an ASIC (Application Specific Integrated Circuit) or an FPGA (Field Programmable Gate Array) integrated in the image processing apparatus 3 is mainly described. However, the functional units illustrated in FIG. 3 may be realized using a CPU. A control unit 12 performs control of operation of each of the functional units of the image processing apparatus 3 described below.

A data reception unit 5 receives images transmitted from each of the cameras 2, and records in a recording unit 6 images of each frame (captured images) that configure the received images. Also, the data reception unit 5 acquires virtual viewpoint information including information related to virtual viewpoint position and direction. The virtual viewpoint information may be acquired via a user interface, or may be decided automatically in accordance with the content of images (motion of a player, for example). The recording unit 6 is connected to a data bus 13, and each functional unit can read or write data with respect to the recording unit 6 via the data bus 13.

The recording unit 6 is a storage device configured by, for example, a hard disk, an SSD (Solid State Drive), or a combination thereof. A data readout unit 7 reads out, from the recording unit 6, a captured image that another functional unit made a request for because the captured image is necessary for generating a virtual viewpoint image.

For example, assume that an instruction (generation instruction) to cause the image processing apparatus 3 to generate a virtual viewpoint image at a virtual viewpoint close to the camera 2A and the camera 2B was made to the image processing apparatus 3. A generation instruction is inputted into the image processing apparatus 3 by a user operating an input interface connected to the image processing apparatus 3, for example. Also, in the foregoing generation instruction is included virtual viewpoint information which includes information related to virtual viewpoint position and direction. However, configuration may also be taken such that a generation instruction and virtual viewpoint information are acquired separately.

The data readout unit 7, having accepted the foregoing generation instruction, reads out, from the recording unit 6, a captured image A that is captured by the camera 2A and a captured image B (captured image of a frame of the same timing as the captured image A) captured by the camera 2B. Specifically, the data readout unit 7 reads out the captured images of the camera 2A and the camera 2B (captured image A and captured image B) which are selected based on information related to the position and direction of the virtual viewpoint from among a plurality of cameras (the 24 cameras illustrated in FIG. 1). Note that below it is assumed that "the same timing" is something that "may include an error if it is small enough that it can be treated as the same timing". The captured image A is the captured image illustrated in FIG. 2A, for example, and the captured image B is the captured image illustrated in FIG. 2B, for example. Next, the data readout unit 7 outputs the read out captured image A and captured image B to an object detection unit 8 (hereinafter referred to as the detection unit 8).

The detection unit 8 separates the captured images into a region of objects (foreground region) and a region of the background (background region) by detecting the objects from each of the captured image A and the captured image B. This separation may be performed using background difference information, for example. This is a method of generating background information based on information of images that were captured in the past within a fixed period of time, and treating a difference from the current captured image as an object. Various object detection methods using background difference information are known and so detailed description thereof is omitted. Regarding object detection, methods using feature amounts or machine learning are also known, and these methods may of course also be employed.

Assume that the captured image A is the captured image illustrated in FIG. 2A. Here, the detection unit 8 detects two objects in the captured image, and obtains the positions at which they are detected (a position of the bottom edge of the region of the object, for example). In the case of FIG. 2A, the position at which one object is detected is (x1, y1), and the position at which the other object is detected is (x0, y0). Also, assume that the captured image B is the captured image illustrated in FIG. 2B. In this captured image, the two objects are overlapping (that is, occlusion between the objects in the captured image is occurring), and here the detection unit 8 detects the two objects as a single object.

Then the detection unit 8 outputs the image (texture) in the region of the detected object, a position at which an object is detected, and an image in the background region (a background image) for each of the captured image A and the captured image B.

Figure 4:
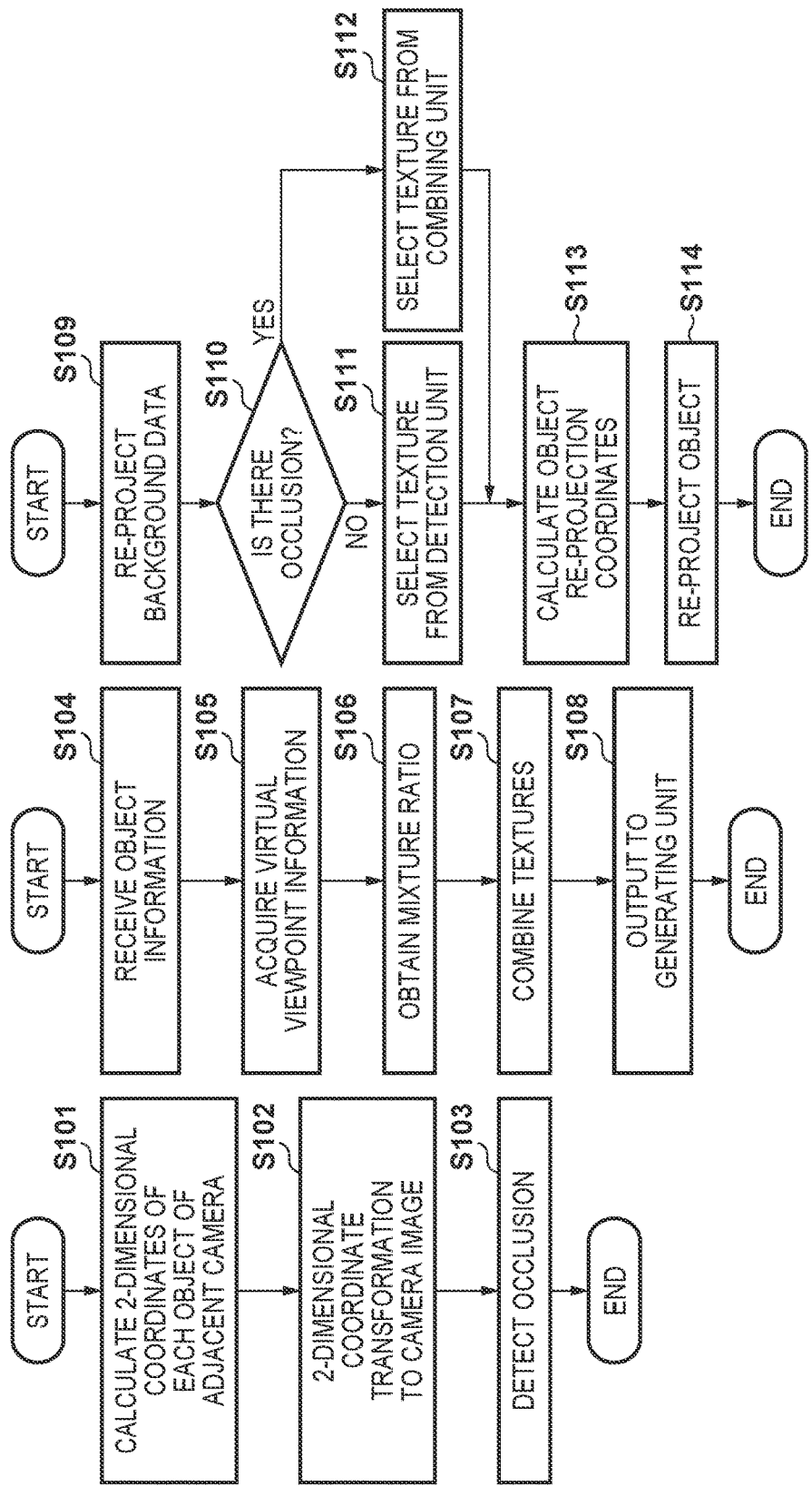
FIGS. 4A-4C are flowcharts for processing that the image processing apparatus 3 performs.

An occlusion detection unit 10 (hereinafter referred to as the detection unit 10) determines whether or not occlusion is occurring between the objects in the captured image for each of the captured image A and the captured image B. Specifically, the occlusion detection unit 10 executes occlusion detection processing with respect to images (the captured images A and B) captured by one or more cameras selected based on the virtual viewpoint information from out of a plurality of cameras (the 24 cameras illustrated in FIG. 1). Processing for determining whether or not occlusion is occurring between the objects in the captured image B is described using FIG. 4A which illustrates a flowchart for the same processing as a concrete example of a method of processing for detecting occlusion. Note that processing for determining whether or not occlusion is occurring between objects is similarly performed for the captured image A and other captured images.

In step S101, the detection unit 10 acquires the position at which the object in the image (frame of the same timing as the captured image B) captured by the camera positioned at a position close to the camera (the camera 2B) that captured the captured image B was detected. Here, the position at which the object is detected in the captured image A which is captured by the camera 2A adjacent to the camera 2B is acquired. In the case of FIG. 2A, the detection positions (x1, y1) and (x0, y0) are acquired.

In step S102, the detection unit 10 transforms the detection positions acquired in step S101 to the positions on the captured image B by "a perspective transformation that causes a portion of the field (the ground) that appears in the image that the camera 2A captures to match a field portion in the image that the camera 2B captures. The perspective transformation is executed by a matrix computation, but the parameters of the matrix used in this matrix computation are decided in advance by a calibration process at a time of camera installation or the like, and held in the memory of the image processing apparatus 3. In the case of FIG. 2A, by transforming the detection positions (x1, y1) and (x0, y0) by perspective transformation the positions (x1', y1') and (x0', y0') in the captured image B as is illustrated in FIG. 2B are respectively acquired.

In step S103, the detection unit 10 determines whether or not two or more positions transformed in step S102 are included in a region of a single object in the captured image B. If the result of the determination is that the condition that "two or more positions transformed in step S102 are included in the region of a single object in the captured image B" is satisfied, it is possible to determine that occlusion between objects is occurring in the captured image B. Specifically, the detection unit 10 transforms the positions of the plurality of objects in the image (the captured image A) captured from the first camera viewpoint among the plurality of camera viewpoints to positions in the image (the captured image B) captured from the viewpoint of the second camera. Then the detection unit 10 determines that occlusion is occurring in the captured image B if the positions of the plurality of objects after the transformation corresponds to less objects. Meanwhile, if this condition is not satisfied, it can be determined that occlusion is not occurring between objects in the captured image B. In the case of FIG. 2B, both the transformed detection positions (x1', y1') and (x0', y0') are included in the region of a single object in the captured image B, and so the occlusion detection unit 10 determines that occlusion is occurring between objects in the captured image B.

Note that in reality, considering error in the coordinate transformation, if two or more positions transformed in step S102 are positions that are close to the region of a single object in the captured image B, the two or more positions may be included in that region. In such a case, occlusion is determined to be occurring in the captured image B even if the positions in the captured image B corresponding to the positions at which two or more objects were detected in the captured image A are not included in the region of a single object in the captured image B.

Here, if occlusion is determined to be occurring between the objects in the captured image B, the captured image B cannot be used in generation of the virtual viewpoint image at a virtual viewpoint close to the camera 2A and the camera 2B. Accordingly, an image that was captured by another camera (other than the camera 2B) close to the camera 2A is used in place of the captured image B.

Then if it is determined that occlusion is occurring in the captured image B, the detection unit 8 makes an instruction to the data readout unit 7 to cause it to read the image (the captured image of the frame of the same timing as the captured image A) captured by another camera (other than the camera 2B) close to the camera 2A. Here, in the explanation, a captured image C (a captured image of the frame of the same timing as the captured image A) captured by the camera 2C is read. Specifically, the data readout unit 7 reads the image (the captured image C) captured by the other camera in the case when it is determined that occlusion is occurring in the image (the captured image B) captured by the camera selected based on the virtual viewpoint information out of the plurality of cameras (the 24 cameras illustrated in FIG. 1). In this way, the detection unit 8 can select the camera 2C that becomes a replacement for the camera 2B for which the occlusion is occurring from the plurality of cameras based on the distance from the camera 2A.

Note that in the above description, an example in which the camera 2C is selected based on the distance from the camera 2A which was selected based on the virtual viewpoint information is described, but limitation is not made to this example. For example, configuration may be taken such that the detection unit 8 selects the camera 2C based on the distance from the camera 2B for which occlusion is occurring. In such a case, the camera 2C, which is the closest not yet selected camera from the camera 2B, is selected. Also, for example, configuration may also be taken such that the detection unit 8 specifies a not yet selected camera among the plurality of cameras (for example, the 24 cameras of FIG. 1), the camera 2C is selected as the closest camera to the position of the virtual viewpoint indicated by the virtual viewpoint information among the not yet selected cameras.

The detection unit 8, by performing, with respect to the captured image C, processing similar to the processing described above that was performed with respect to the captured image A and the captured image B, detects an image (texture) in the region of an object, a position at which the object was detected, and an image (background image) in the background region from the captured image C. Then, the detection unit 10 similarly determines whether or not occlusion is occurring between the objects in the captured image C. If the result of the determination is that the detection unit 10 determines that occlusion is occurring between the objects in the captured image C as well, the image captured by another camera (other than the camera 2B and the camera 2C) close to the camera 2A is read out. In this way, an image captured by a camera that is as close as possible to the camera 2A that is a "captured image in which occlusion is not occurring between objects" is acquired. Below it is assumed that occlusion is not occurring between objects in the captured image C. In such a case, the detection unit 8 outputs the information detected for the captured image A and the information detected for the captured image C. In this way, the detection unit 8 of the present embodiment specifies a camera viewpoint at which occlusion (overlapping of objects) is not occurring from out of the plurality of camera viewpoints (viewpoints of the plurality of cameras illustrated in FIG. 1).

A combining unit 11 performs processing for generating an object in an image from a virtual viewpoint. Processing that the combining unit 11 performs is described using FIG. 4B which illustrates a flowchart for the same processing. Note that the combining unit 11 does not operate in a case when occlusion is not occurring between objects in the captured image B, and operates in a case when occlusion is occurring between objects in the captured image B. Specifically, the combining unit 11 does not operate in a case when occlusion is not occurring between objects in the images captured by each of the cameras decided at the start as cameras close to the virtual viewpoint. Meanwhile, the combining unit 11 does operate in a case when occlusion is occurring between objects in the image captured by at least one of the cameras that are decided to be cameras close to the virtual viewpoint from the beginning.

In step S104, the combining unit 11 acquires information that the detection unit 8 outputted for the captured image A and information the detection unit 8 outputted for the captured image C. In step S105, the combining unit 11 acquires the position of a virtual viewpoint included in the aforementioned generation instruction.

In step S106, the combining unit 11 uses the position A of the camera 2A, the position C of the camera 2C, and the position V of the virtual viewpoint to obtain ratios (mixture ratios) at which to combine each object in the case of generating a single combination object by combining an object in the captured image A and an object in the captured image C. When, for example, the distance between the position V and the position A is made to be DA and the distance between the position V and the position C is made to be DC, the combination ratio RA for the object in the captured image A is DC/(DA+DC), and the combination ratio RC of the object in captured image C is DA/(DA+DC). That is, the combination ratios corresponding to the objects in the images captured in the cameras close to the virtual viewpoint are made to be higher, and the combination ratios corresponding to objects in images captured by cameras farther from the virtual viewpoint are made to be lower.

In step S107, the combining unit 11 generates a combination texture (a combination object) by combining a texture A for which the pixel values of textures of objects in the captured image A are multiplied by RA and texture C for which the pixel values of the texture of the object in the captured image C are multiplied by RC. Such processing for combining the two object textures is a known technique as typified by morphing processing, and so detailed description thereof is omitted. In step S108, the combining unit 11 outputs a combination object generated in step S107 to a generating unit 9.

The generating unit 9 generates a virtual viewpoint image. Processing that the generating unit 9 performs is described using FIG. 4C which illustrates a flowchart for the same processing.

In step S109, the generating unit 9 generates a background portion for the virtual viewpoint image. The method of generating the background portion is not limited to a specific method. For example, the background image that the detection unit 8 detected for the captured image A may be transformed by perspective transformation to generate the background portion for the virtual viewpoint image. It is assumed that the matrix used in this perspective transformation is known beforehand.

In step S110, the generating unit 9 determines whether or not occlusion is occurring between objects in the images captured by two cameras that the virtual viewpoint is close to. In the foregoing example, it is determined whether or not occlusion is occurring between the objects in both the captured image A and the captured image B. If the result of the determination is that occlusion is not occurring between objects in either of the images captured by the two cameras that the virtual viewpoint is close to, the processing advances to step S111, and if it is occurring in at least one of them, the processing advances to step S112.

In step S111, the generating unit 9 acquires from the detection unit 8 a texture of an object that the detection unit 8 detected from the captured image A. In step S112, the generating unit 9 acquires from the combining unit 11 the combination object that the combining unit 11 generated.

In step S113, the generating unit 9 obtains the position of the object to be arranged on the virtual viewpoint image. In the case when the processing advances from step S111 to step S113, the generating unit 9, in step S113, obtains "the arrangement position on the virtual viewpoint image" of the texture of the object detected from the captured image A. For example, it obtains in advance relation information indicating at what position a target object in an image captured by a camera appears in an image of a particular viewpoint, and obtains a position into which the position at which the object is detected in the captured image A is transformed using the relation information.

Meanwhile, in the case when the processing advances from step S112 to step S113, the generating unit 9, in step S113, obtains the position of the combination object in the virtual viewpoint image. For example, the position into which the position at which the object is detected in the captured image A is transformed using the foregoing relation information is made to be the combination object position.

In the case when the processing advances from step S111 to step S114 via step S113, the generating unit 9, in step S114, performs the following processing. Specifically, it arranges (re-projects) the texture of the object detected from the captured image A at the position (re-projection coordinates) obtained in step S113 in the virtual viewpoint image, and outputs the virtual viewpoint image after the arrangement.

Meanwhile, in the case when the processing advances from step S112 to step S114 via step S113, the generating unit 9, in step S114, performs the following processing. Specifically, it arranges (re-projects) the combination object at the position (re-projection coordinates) obtained in step S113 in the virtual viewpoint image, and outputs the virtual viewpoint image after the arrangement.

Note that here the re-projection coordinates of each object are inspected, re-projection is performed in order of depth from the farthest object in the image, which is in turn overwritten by closer objects. By this processing, it is possible to correctly express the in front/behind relationship in the display of the objects.

Figure 2D:
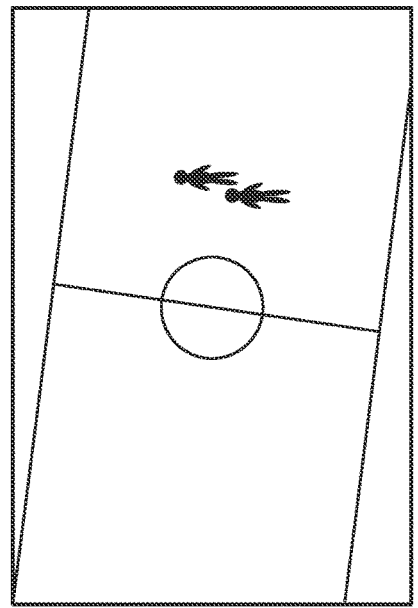

An example of a virtual viewpoint image based on the captured image of FIG. 2A and the captured image of FIG. 2C is illustrated in FIG. 2D. The virtual viewpoint image of FIG. 2D is a virtual viewpoint image generated in the case when a virtual viewpoint is set at an intermediate position between the camera 2A and the camera 2B. Also, the output destination of the virtual viewpoint image produced by the generating unit 9 is not limited to any specific output destination, and, for example, output may be to a monitor or projector that the image processing apparatus 3 comprises, and output may be to an external terminal device.

Note that it is assumed that the information handled as information that is known beforehand in the present embodiment and the variation below (for example, the arrangement positions of each of the cameras 2 and the foregoing relation information) is registered in a memory in the image processing apparatus 3 in advance.

<Variation>

Various forms can be considered for the aforementioned "instruction to cause the image processing apparatus 3 to generate a virtual viewpoint image at a virtual viewpoint close to the camera 2A and the camera 2B". For example, a diagram in which a layout diagram of each of the cameras 2 superimposed on an overhead view that overlooks the stadium 1 is displayed on a display unit to present it to the user and the user designates a particular position on the diagram as the position of the virtual viewpoint. The control unit 12 then selects a camera that is close to the position designated on the diagram. Also, in a case when the position of the virtual viewpoint is defined to be a center-point position between adjacent cameras, configuration may also be taken so as to set the center-point position of the two cameras as the virtual viewpoint position when the user designates two cameras on the aforementioned diagram.

Also, while each of the cameras 2 is positioned to surround the stadium 1 in the first embodiment, the first embodiment can be similarly applied even in cases in which the cameras 2 are positioned to surround a field of an image capturing target other than a stadium 1.

Second Embodiment

In the first embodiment, all of the functional units described in FIG. 3 are described as being implemented as hardware. However, configuration may be taken to implement the recording unit 6 by a memory, and to implement other functional units by software (computer programs). In such a case, it is possible to apply a computer apparatus capable of executing such software to the foregoing image processing apparatus 3. An example of a hardware configuration of a computer apparatus that can be applied to the image processing apparatus 3 is described using the block diagram of FIG. 6.

A CPU 601 executes processing using a computer program and data stored in a RAM 602 or a ROM 603. By this, the CPU 601 performs operation control of the computer apparatus overall, and also executes or controls all processing described above as something that the image processing apparatus 3 performs.

The RAM 602 has an area for storing computer programs and data loaded from the ROM 603 or an external storage apparatus 606 and data received from outside via an I/F (interface) 607. Furthermore, the RAM 602 also has a work area used when the CPU 601 executes various processing. In this way, the RAM 602 can provide various areas as necessary. Setting data of the image processing apparatus 3 and a boot program which do not need to be rewritten are stored in the ROM 603.

An operation unit 604 is configured by a mouse, a keyboard, or the like, and the user of the image processing apparatus 3 can input various instructions to the CPU 601 by operating it. A display unit 605 is configured by a CRT, a liquid crystal screen, or the like, and can display results of processing by the CPU 601 using image, text, or the like. Note that a touch panel screen may be configured to integrate the operation unit 604 and the display unit 605.

The external storage apparatus 606 is a large capacity information storage device as typified by a hard disk drive device. An OS (operating system), computer programs for causing the CPU 601 to execute or control each process described above as something that the image processing apparatus 3 performs, and data is saved in the external storage apparatus 606. This data includes what was described above as information known beforehand. A computer program or data saved in the external storage apparatus 606 is appropriately loaded to the RAM 602 in accordance with control by the CPU 601, and becomes a target of processing by the CPU 601. The recording unit 6 described above can be implemented by the RAM 602 or the external storage apparatus 606.

An I/F 607 functions as an interface for performing data communication with an external device, and, for example, the aforementioned cameras 2 are connected to the I/F 607, and the images from each of the cameras 2 are received via the I/F 607.

Figure 6:
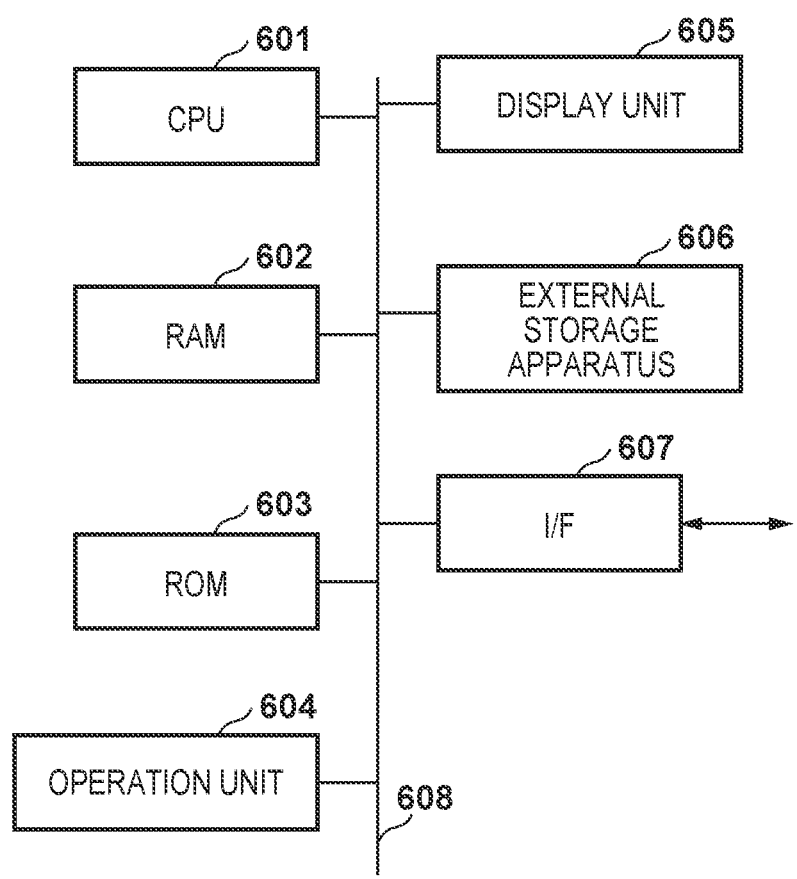
FIG. 6 is a block diagram that illustrates an example of a hardware configuration of the computer apparatus.

Each of the CPU 601, the RAM 602, the ROM 603, the operation unit 604, the display unit 605, the external storage apparatus 606, and the I/F 607 are connected to a bus 608. Note that the configuration illustrated in FIG. 6 is merely an example of a hardware configuration of a computer apparatus applied to the image processing apparatus 3.

Figure 5:
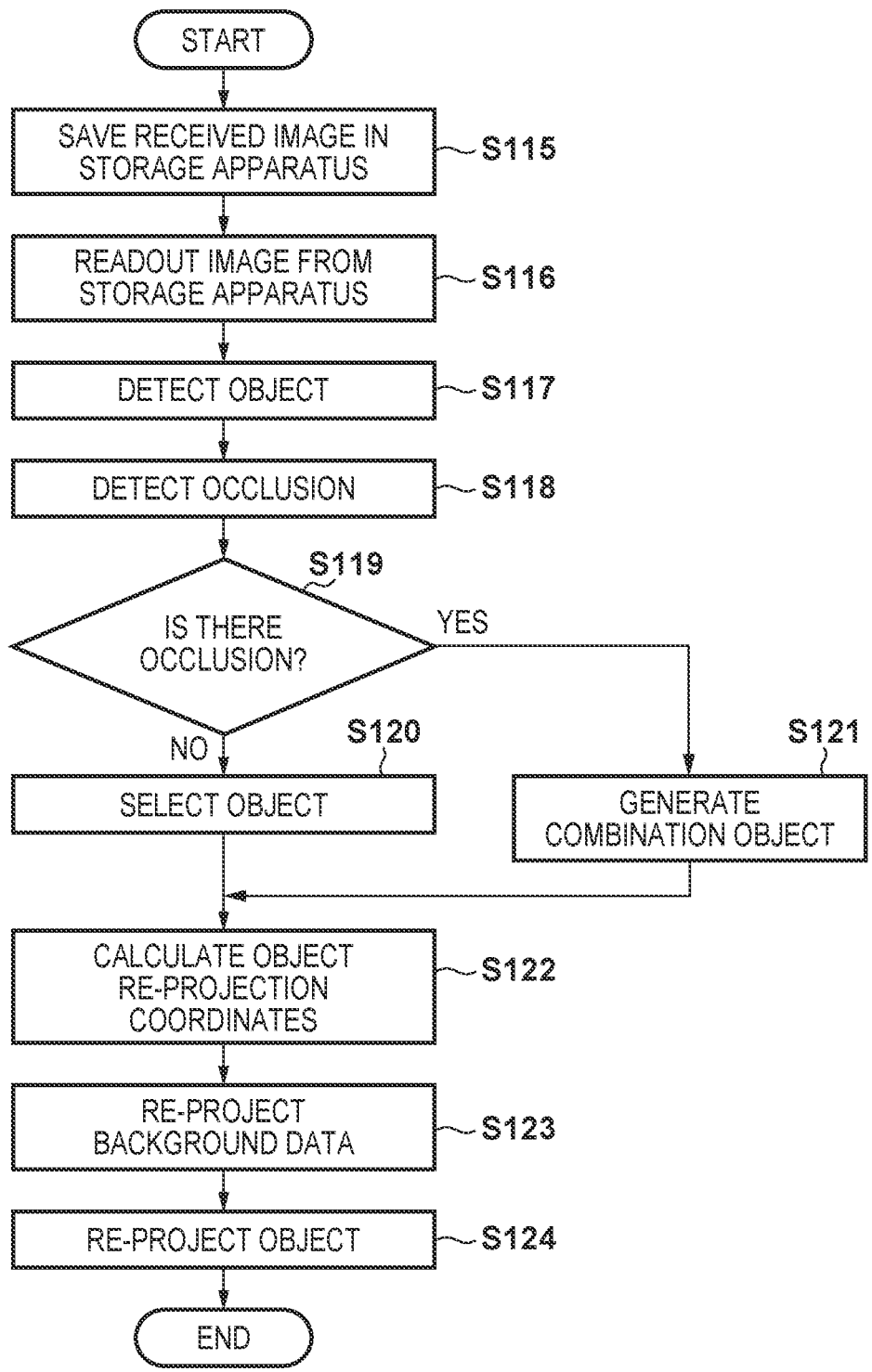
FIG. 5 is a flowchart for processing that a computer apparatus performs.

In a case when such a computer apparatus executes the processing of the image processing apparatus 3 described in the first embodiment, the computer apparatus performs processing in accordance with a flowchart described in FIG. 5. Note that the details of the processing in each step of FIG. 5 was already discussed in the first embodiment, and so explanation is simplified here.

In step S115, the CPU 601 saves captured images of each of the cameras 2 received via the I/F 607 in the external storage apparatus 606. In step S116, the CPU 601 reads into the RAM 602 a captured image required for generation of a virtual viewpoint image from the external storage apparatus 606. In step S117, the CPU 601 performs processing that is the same as processing by the detection unit 8 for the captured images that are respectively read out into the RAM 602. In step S118, the CPU 601 performs processing that is similar to the processing by the detection unit 10.

In step S119, the CPU 601 determines whether or not occlusion is occurring between objects in captured images (the captured image A and the captured image B) required for generation of the virtual viewpoint image. If the result of the determination is that occlusion is occurring, the processing advances to step S121, and if occlusion is not occurring, the processing advances to step S120.

In step S120, the CPU 601 acquires a texture of an object detected in the captured image A. Meanwhile, in step S121, the CPU 601 generates a combination object by processing similar to the processing by the combining unit 11.

In step S122, the CPU 601 obtains a position at which to arrange the object in the virtual viewpoint image, and in step S123 the CPU 601 generates the background portion in the virtual viewpoint image similarly to the generating unit 9. Then, in step S124, the CPU 601 generates the virtual viewpoint image in which the object is arranged at the position obtained in step S122, and outputs the virtual viewpoint image.

By virtue of the configuration of the present embodiment, it is possible to improve the image quality of a virtual viewpoint image in an environment in which occlusion can occur.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-158912, filed Aug. 12, 2016, which is hereby incorporated by reference herein in its entirety.

What is claimed is:

1. An image processing apparatus that generates a virtual viewpoint image based on one or more captured images out of a plurality of captured images obtained based on capturing by a plurality of cameras, the apparatus comprising:
at least one hardware processor; and
a memory which stores instructions executable by the at least one hardware processor to cause the image processing apparatus to:
acquire virtual viewpoint information including information related to a position and a direction of a virtual viewpoint;
determine whether a first object overlaps with at least a part of a second object in at least one image captured by at least one of the plurality of cameras;
decide, based on the position and the direction of the virtual viewpoint indicated by the acquired virtual viewpoint information and on a result of the determination as to whether the first object overlaps with at least a part of the second object in the at least one image, one or more captured images to be used for generation of a virtual viewpoint image according to the virtual viewpoint information; and
generate the virtual viewpoint image according to the virtual viewpoint information using the one or more captured images decided to be used for generation of the virtual viewpoint image.

2. The image processing apparatus according to claim 1, wherein, when a first camera and a second camera are selected from the plurality of cameras based on the acquired virtual viewpoint information, in a case when it is determined that the first object overlaps with at least a part of the second object in an image captured by the second camera, a third camera that is different to the second camera is selected from the plurality of cameras, and in a case when it is determined that the first object does not overlap with the second object in an image captured by the selected third camera, a captured image of the first camera and a captured image of the third camera are decided as captured images to be used for generation of the virtual viewpoint image.

3. The image processing apparatus according to claim 1, wherein whether the first object overlaps with at least a part of the second object in the at least one image captured by at least one of a first camera and a second camera is determined based on positions of objects detected in images captured respectively by the first camera and the second camera, wherein the first camera and the second camera are selected from the plurality of cameras based on the virtual viewpoint information, and wherein a captured image of the first camera and a captured image of a third camera different from the second camera among the plurality of cameras are decided to be used for generation of the virtual viewpoint image based on a distance between the third camera and the first camera, in a case where it is determined that the first object overlaps with at least a part of the second object in an image captured by the second camera.

4. The image processing apparatus according to claim 2, wherein the third camera is selected from the plurality of cameras based on the acquired virtual viewpoint information.

5. The image processing apparatus according to claim 1, wherein based on positions of objects detected in images captured respectively by a first camera and a second camera selected from the plurality of cameras based on the virtual viewpoint information, it is determined whether the first object overlaps with at least a part of the second object in the at least one image captured by at least one of the first camera and the second camera.

6. The image processing apparatus according to claim 1, wherein in a case when transformed positions of a plurality of detected objects in an image captured by a first camera among the plurality of cameras correspond to a lower number of objects in an image captured by a second camera than the plurality of detected objects in the image captured by the first camera, it is determined that the first object overlaps with at least a part of the second object in the image captured by the second camera, wherein the transformed positions are obtained by transforming positions of the plurality of detected objects in the image captured by the first camera into positions in the image captured by the second camera.

7. The image processing apparatus according to claim 6, wherein in a case when the transformed positions of the plurality of detected objects do not correspond to a lower number of objects than the plurality of detected objects in the image captured by the first camera, it is determined that the first object does not overlap with the second object in the image captured by the second camera.

8. The image processing apparatus according to claim 1, wherein a captured image in which the first object overlaps with at least a part of the second object is decided not to be used in generation of the virtual viewpoint image.

9. The image processing apparatus according to claim 1, wherein the virtual viewpoint image is generated by combining objects in the plurality of captured images decided to be used for generation of the virtual viewpoint image, based on a combination ratio according to a distance between the position of the virtual viewpoint and a viewpoint position of a camera that obtained the captured image decided to be used for generation of the virtual viewpoint image.

10. The image processing apparatus according to claim 1, wherein the plurality of cameras are positioned so as to surround an image capturing target field.

11. An image generation method of generating a virtual viewpoint image based on one or more captured images out of a plurality of captured images obtained based on capturing by a plurality of cameras, the method comprising:

acquiring virtual viewpoint information including information related to a position and a direction of a virtual viewpoint;

determining whether a first object overlaps with at least a part of a second object in at least one image captured by at least one of the plurality of cameras;

deciding, based on the position and the direction of the virtual viewpoint indicated by the acquired virtual viewpoint information and on a result of the determination as to whether the first object overlaps with at least a part of the second object in the at least one image, one or more captured images to be used for generation of a virtual viewpoint image according to the virtual viewpoint information; and generating the virtual viewpoint image according to the virtual viewpoint information using the one or more captured images decided to be used for generation of the virtual viewpoint image.

12. A non-transitory computer-readable storage medium storing a program for causing a computer to execute a method of generating a virtual viewpoint image based on one or more captured images of a plurality of captured images obtained based on capturing by a plurality of cameras, the method comprising:

acquiring virtual viewpoint information including information related to a position and a direction of a virtual viewpoint;

determining whether a first object overlaps with at least a part of a second object in at least one image captured by at least one of the plurality of cameras;

deciding, based on the position and the direction of the virtual viewpoint indicated by the acquired virtual viewpoint information and on a result of the determination as to whether the first object overlaps with at least a part of the second object in the at least one image, one or more captured images to be used for generation of a virtual viewpoint image according to the virtual viewpoint information; and generating the virtual viewpoint image according to the virtual viewpoint information using the one or more captured images decided to be used for generation of the virtual viewpoint image.

* * * * *